(12) United States Patent
Khabazian

(10) Patent No.: US 9,694,286 B2
(45) Date of Patent: Jul. 4, 2017

(54) ANOMALY DETECTION FOR RULES-BASED SYSTEM

(71) Applicant: Mohammad Iman Khabazian, Santa Clara, CA (US)

(72) Inventor: Mohammad Iman Khabazian, Santa Clara, CA (US)

(*) Notice: Subject to any disclaimer, the term of this patent is extended or adjusted under 35 U.S.C. 154(b) by 190 days.

(21) Appl. No.: 14/632,396

(22) Filed: Feb. 26, 2015

(65) Prior Publication Data

US 2015/0238866 A1    Aug. 27, 2015

Related U.S. Application Data

(60) Provisional application No. 61/945,815, filed on Feb. 27, 2014.

(51) Int. Cl.
*A63F 13/75* (2014.01)

(52) U.S. Cl.
CPC .................................. *A63F 13/75* (2014.09)

(58) Field of Classification Search
CPC ...................... A63F 13/75; A63F 13/30–13/88
See application file for complete search history.

(56) References Cited

U.S. PATENT DOCUMENTS

2008/0305869 A1* 12/2008 Konforty ............... A63F 13/12
463/29

* cited by examiner

*Primary Examiner* — William H McCulloch, Jr.
*Assistant Examiner* — Yingchuan Zhang
(74) *Attorney, Agent, or Firm* — Kunzler Law Group

(57) ABSTRACT

For cheat likelihood calculation, a method records client activity for a client. The client activity includes components of a game economy including burns calculated as a function of measurable client sacrifices to a game and earns calculated as a function of measurable game rewards from the game. The method calculates the cheat likelihood from the probability of the client activity being anomalous.

14 Claims, 13 Drawing Sheets

```
                ┌─────────────────────────┐
                │      Spend Data         │
                │         205             │
                ├─────────────────────────┤
                │     Playtime Data       │
                │         210             │
                ├─────────────────────────┤
                │  Viral Installation Data│
                │         215             │
                ├─────────────────────────┤
                │   Burn Time Interval    │
                │         230             │
                └─────────────────────────┘
```

FIG. 2A

```
                ┌─────────────────────────┐
                │      Game Items         │
                │         255             │
                ├─────────────────────────┤
                │     Game Levels         │
                │         260             │
                ├─────────────────────────┤
                │   Game Enhancements     │
                │         265             │
                └─────────────────────────┘
```

FIG. 2B

ANOMALY DETECTION FOR RULES-BASED SYSTEM

CROSS-REFERENCE TO RELATED APPLICATIONS

This application claims priority to U.S. Provisional Patent Application Ser. No. 61/945,815 entitled "Anomaly Detection for Rules-Based Software System" and filed on Feb. 27, 2014 for Mohammad Iman Khabazian, which is incorporated herein by reference.

FIELD

The subject matter disclosed herein relates to anomaly detection and more particularly relates to anomaly-based sheet detection for a rule-based system.

BACKGROUND

Description of the Related Art

Games such as online games are popular with many users. Unfortunately, some users may cheat to gain advantage.

BRIEF SUMMARY

A method for cheat likelihood calculation is disclosed. The method records client activity for a client. The client activity includes components of a game economy including burns calculated as a function of measurable client sacrifices to a game and earns calculated as a function of measurable game rewards from the game. The method calculates the cheat likelihood from the probability of the client activity being anomalous. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a schematic block diagram illustrating one embodiment of burn data;

FIG. 2B is a schematic block diagram illustrating one embodiment of earn data;

DETAILED DESCRIPTION

Figure 1A:
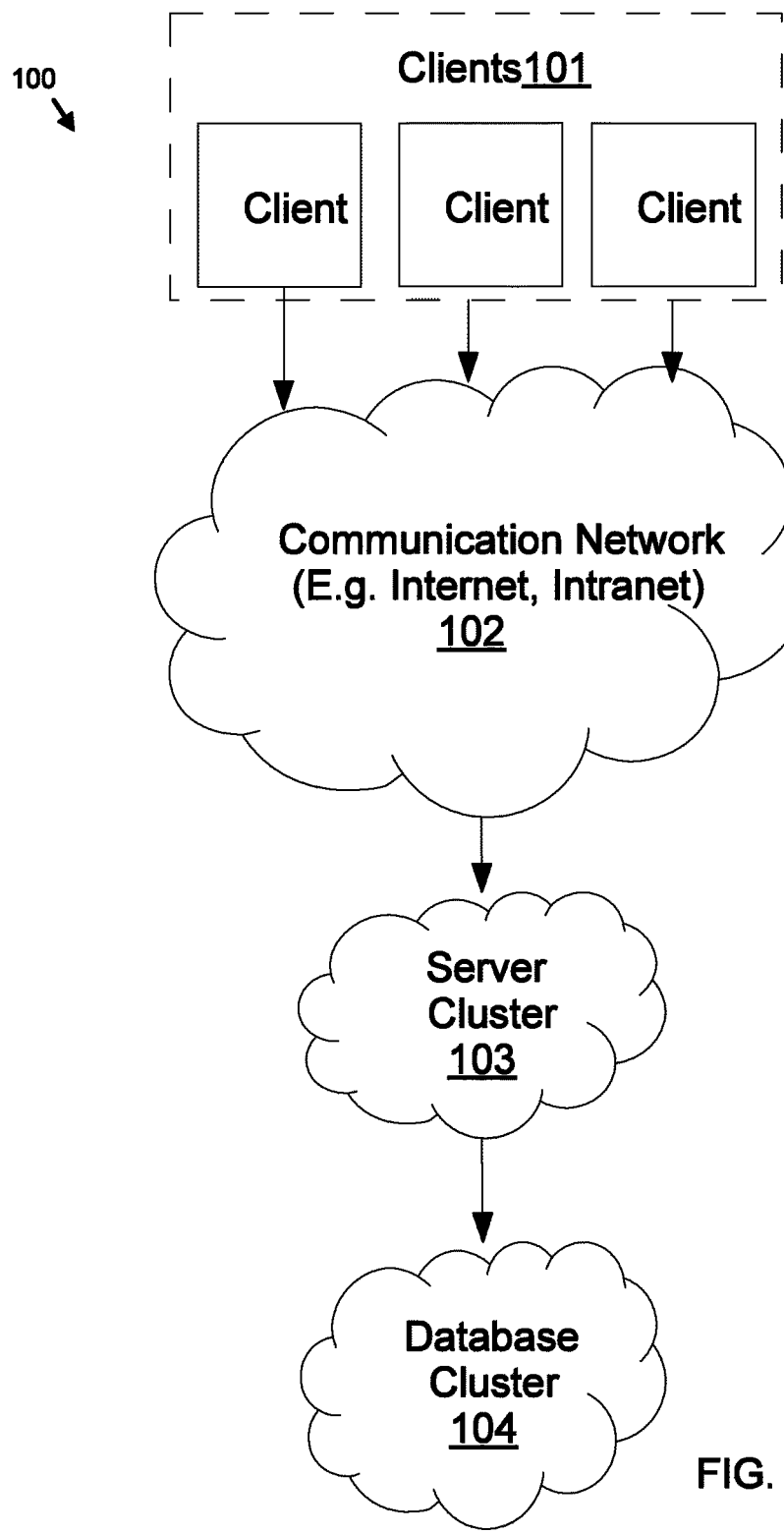
FIG. 1A is a schematic block diagram illustrating one embodiment of a client interaction system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The embodiments disclosed in this application describe an anomaly detection method and system to determine whether a consumer of a stateful, rules-based software system is circumventing rules enforced by client-side logic. Anomaly detection is achieved by running code on the server that inspects client-provided information that dictates consumer state changes. Machine learning algorithms are used to "learn" correlations between consumer activity and their position in the software's economy. A statistics-based profile for all user states over a period is generated. User state changes dictated by user activity are compared to the profile to arrive at a cheat likelihood score for each user activity. Using the profile as a reference, the anomaly detection system and process estimate and prioritize potentially anomalous user activity based on the probability that the behavior is anomalous by giving it a "cheat-likelihood" score. As the administrator manually designates activities as "normal" or "anomalous" the software also learns the cheat-likelihood thresholds for automated classification. The level of the cheat likelihood is compared to learned thresholds to classify the activity and determine if automatic actions should be initiated (like consumer banning, notification, and consumer state penalization or administrator notification). The system is comprised an interface for the consumer facing client, an administrative panel, distributed server software for both the consumer and administrator, and a distributed database.

Points of novelty include:

The assembly of an assortment of novel art as well as prior art into particular modules and layers and the particular assortment of these modules and layers to create a complete solution that identifies cheating in any rules based system with positions that can be mapped to scalars values.

The assembly of an assortment of novel art as well as prior art that determines the probability for a user's activity.

The assembly of an assortment of novel art as well as prior art that scores a user's activity based on the likelihood of it being anomalous.

Reducing a multidimensional economy to two dimensions Total Earn and Total Burn (earn, being what the user has received, and burn being what the user has sacrificed) by applying the insight that Total Earn equals Total Burn to linear regression algorithms.

A method of incorporating previous learning into a batch learning model.

An algorithm to efficiently determine the optimal learning rate.

The "hybrid (Batch/Online) linear regression algorithm" which improves on the batch linear regression algorithm.

The statistical splitting tree data structure that adaptively capture statistical models over data that can fluctuate in its fundamental behavior.

Using these methods, we can enable the building of software that relies on client side rule enforcement. While this technology is particularly relevant to online games and gamified software applications, it is also relevant to any rules based system with earnable positions within a client-server topology.

The description of elements in each figure may refer to elements of proceeding figures. Like numbers refer to like elements in all figures, including alternate embodiments of like elements.

Physical Deployment

FIG. 1A is a schematic block diagram illustrating one embodiment of a client interaction system 100. The system includes clients 101, a communication network 102, a server cluster 103, and a database cluster 104.

The system 100 provides game activity for the client 101 in the form of the game. The game activity includes components of a game economy where users of the clients 101 acquire benefits in exchange for effort and monetary payments. The components include game activity benefits, referred to hereafter as earns, and user sacrifices, referred to hereafter as burns.

Unfortunately, some users may cheat the system 100 in order to acquire game activity benefits without abiding by game rules and to the detriment of other users. As a result, it is in the interest of the administrators of the system 100 to identify users that are acquiring unearned game activity benefits or earns by cheating so that the game is fair and unbiased.

An online game may typically incorporate rules for the game on the client 101 while the state information of the game is saved on the server cluster 103 and in the database cluster 104. Including the rules of the game in code executing on the client 101 reduces the demands on the server cluster 103. Adding rules or redundant rules to the server cluster 103 increases the demands on the server cluster 103. In cases where game logic does occur on the server, a user may cheat the game by mimicking functions of the client code and interacting directly with the server cluster 103.

However, the large number of users engaging in game activity makes it difficult to identify cheaters. The embodiments described herein calculate a cheat likelihood from the probability of game activity being anomalous. In particular, the embodiments calculate a probability of a user receiving earns based on burns as will be described hereafter. In addition, the embodiments allow the administrators to detect cheating without incorporating the rules of the game in the code executed by the server cluster 103.

Clients 101 refer to software that runs on the consumer's (i.e. end user's) computer (desktop, laptop, mobile, or any device that can run the client software). Clients 101 will send data and request data to the server through the internet or some network protocol. Administrative Client 201 is the admin panel which runs on the administrator's computer. Communication Network 102 represents the public internet, private intranet, or other communication network.

Consumer Server Cluster 103 is software that runs on the server that supports the consumer data flow. Administrator Server Cluster 203 is software that runs on the server that supports the administrator data flow. Server Clusters 103 and 203 might physically be a single physical node, a group of physical nodes, a virtual node, a group of virtual nodes, or any devise that can run the server software. The server software will handle requests from the client, runs the logic described in this patent application, and uses the database to store data. The Database Cluster 104 is a physical node, group of physical nodes, virtual node, or group of virtual nodes able to store data and retrieve stored data.

Administrator Panel

Figure 1B:
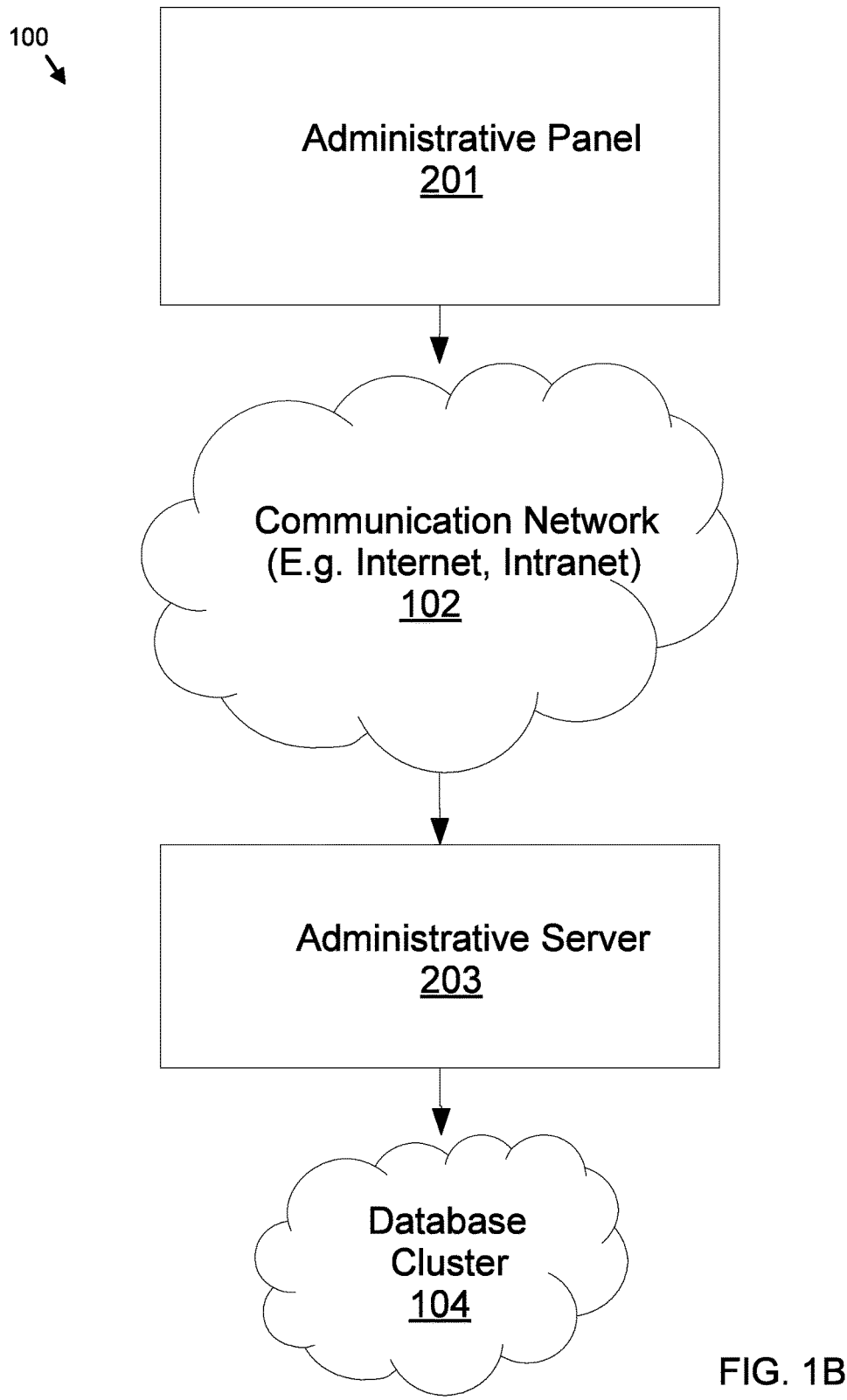
FIG. 1B is a schematic block diagram illustrating one embodiment of an administrator support system.

FIG. 1B is a schematic block diagram illustrating one embodiment of an administrator support portion of the system 100. The system 100 includes an administrative panel 201, the communication network 102, an administrative server 203, and the database cluster 104.

The following are features enabled by the administrative panel 201 of the system 200:

Running any SQL query against the production DB. For example, a query could return only those users with declined verifications. This includes creating custom views for particular queries.

Declare which "scalars" will be "watched scalars" (i.e. the unverified earn components of the economy).

Make any configuration allowable by the software.

Set automated actions to occur when users or activity meet a certain criteria. For example, we might want to automatically ban or penalize any user who is classified as "anomalous".

Review list of activities that meet criteria previously set by administrator. For example, list all activities with assigned cheat likelihood of 0.95 and up.

Review log information for a given activity to further investigate detailed actions taken by the user.

Manual flagging of activity as "anomalous" or "not anomalous". The details of how this flagging feeds into the Learning Thresholds for Classification are discussed below in the section of the same name.

Administrator may employ the administrative panel 201 to direct the embodiments to calculate cheat likelihoods for users of the game. The administrative panel 201 may communicate to the communication network 102 with the administrative server 203 to calculate the cheat likelihoods for users based on the data in the database cluster 104.

The calculation of the cheat likelihood is based on an assumption that the user's earns from the game should be proportional to the user's burns or sacrifices to the game. As a result, users with earns that are out of proportion to burns are more likely to be cheating by directly manipulating the game.

FIG. 2A is a schematic block diagram illustrating one embodiment of burn data 200. The burn data 200 maybe organized as a data structure and stored in the database cluster 104. In the depicted embodiment, the burn data 200 includes spend data 205, playtime data 210, viral installation data 215, and a burn time interval 230.

The spend data 205 may record a client's monetary spending as part of game activity. The spend data 205 may be denominated in a legal currency. For example, the spend data 205 may record that the client spent $25.00 as part of game activity. Alternatively, the spend data 205 may be denominated in a private currency.

The playtime data 210 may record the client's time engaged in the game activity. The playtime data 210 may be recorded in time units. For example, the playtime data 210 may record that the client engaged in four hours of game activity.

The viral installation data 215 may record viral installations resulting from the client's game activity. A viral installation may be an installation of the game resulting from the client's game activity. For example, if the client invites a friend to join the game and the friend does so, a viral installation may be recorded in the viral installation data 215.

The burn time interval 230 may record a time interval when the spend data 205, the playtime data 210, and the viral installation data 215 are recorded. The time interval may be an interval of game activity. Alternatively, the time interval may be a specific time when one of the spend data 205, the playtime data 210, and the viral installation data 215 are recorded.

FIG. 2B is a schematic block diagram illustrating one embodiment of earn data 250. The burn data 250 maybe organized as a data structure on the database cluster 104. In the depicted embodiment, the earn data 250 includes game items 255, game levels 260, and game enhancements 265.

The game items 255 may record virtual items acquired by the client during game activity. For example, the virtual items may be virtual swords, virtual potions, and the like. The game items 255 may include a timestamp that records when each item is acquired.

The game levels 260 may record when the client progresses from one level to another level as part of the game activity. Each entry for a game level progression may record the initial level, the subsequent level, and a timestamp of the progression.

The game enhancements 265 may record virtual enhancements to the game activity that are acquired by the client during game activity. For example, the game enhancements 265 may be virtual abilities, virtual information, and the like. Each entry for the game enhancements 265 may record an enhancement type and a timestamp of when the enhancement was acquired.

Figure 2C:
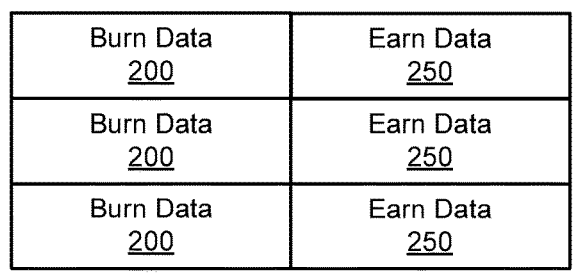
FIG. 2C is a schematic block diagram illustrating one embodiment of band data.

FIG. 2C is a schematic block diagram illustrating one embodiment of band data 220. The band data 220 maybe organized as a data structure in the database cluster 104. The band data 220 includes selected burn data 200 that is organized as a band for statistical analysis. In addition, the band data 220 includes corresponding earn data 250. The burns of the burn data are thus organized in discrete bands with corresponding earns. The burn data 200 and earn data 250 are analyzed in bands as defined by the band data 220.

Because burn data 200 is continuous over the burn time interval 230, there are an infinite number of potential burn data events. The burn data 200 is therefore organized into bands 220 that satisfy a banding policy. In one embodiment, the banding policy is satisfied if burn data 200 is organized into a band 220 with a minimal amount of samples included in the band 220. In addition, the banding policy may be satisfied if samples in the band 220 do not exceed a maximum allowable variance.

Figure 2D:
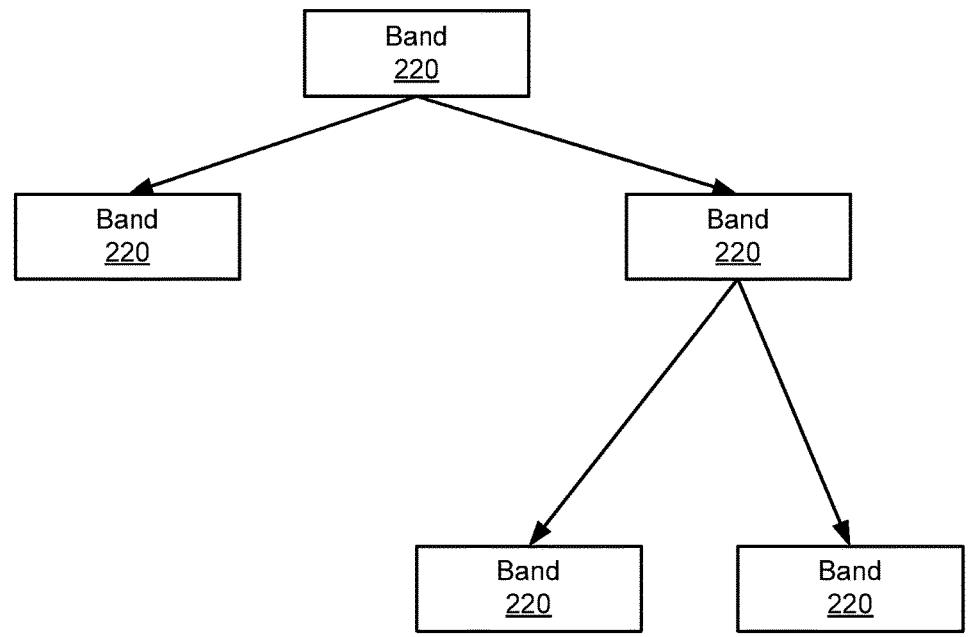
FIG. 2D is a schematic block diagram illustrating one embodiment of band data organization.

FIG. 2D is a schematic block diagram illustrating one embodiment of band data organization 235. In one embodiment, if band data 220 includes samples that exceed the maximum allowable variance and do not satisfy the banding policy, the band data 220 may be divided into two or more sets of band data 220 that each satisfy the banding policy. The band data organization 235 may be organized as a tree, with each band of band data 220 satisfying the banding policy. As a result, the probability of the total earn corresponding to the burn data 200 may be calculated from each band of band data 220.

Figure 2E:
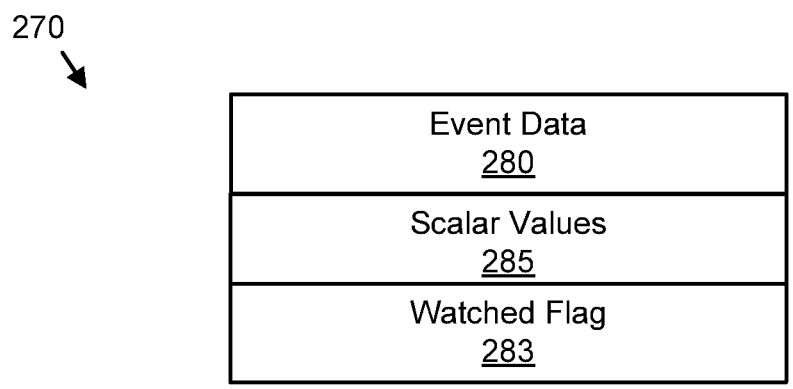
FIG. 2E is a schematic block diagram illustrating one embodiment of a log.

FIG. 2E is a schematic block diagram illustrating one embodiment of a log 270. The log 270 may be received from the client 101. In the depicted embodiment, the log 270 includes event data 280, scalar values 285, and a watched flag 283.

The event data 280 may record events. Events may be human readable information that describe occurrences as part of the game activity. The scalar values 285 describes state information for the game. In one embodiment, the scalar values include a string id and a numeric value that are associated with a user's account and describe how many of each item the user has attained in the software. For example, the scalar with the string id "points" and a value user of 100 indicates that the user has 100 points. The values in the scalars change as the user interfaces with the system 100. For example, as the user receives earns, the client 101 may communicate the event data 282 reflect the earns. A select subset of these scalar values 285 are significant to the game economy and may be "watched scalars". The watched scalars may be indicated by setting the watched flag 283.

Figure 3:
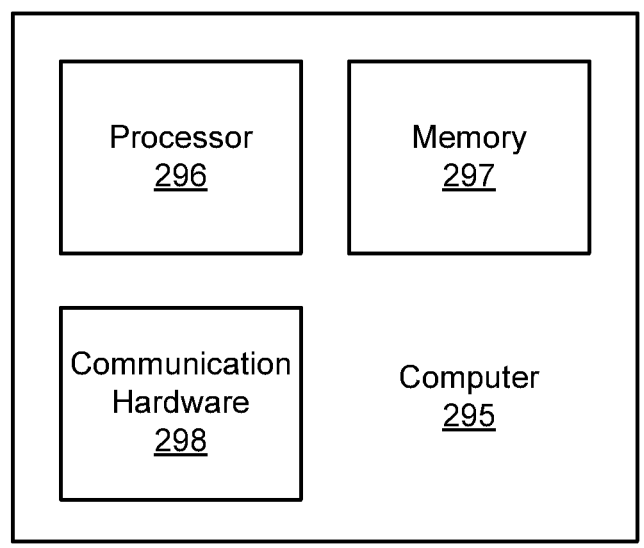
FIG. 3 is a schematic block diagram illustrating one embodiment of a computer.
Figure 4:
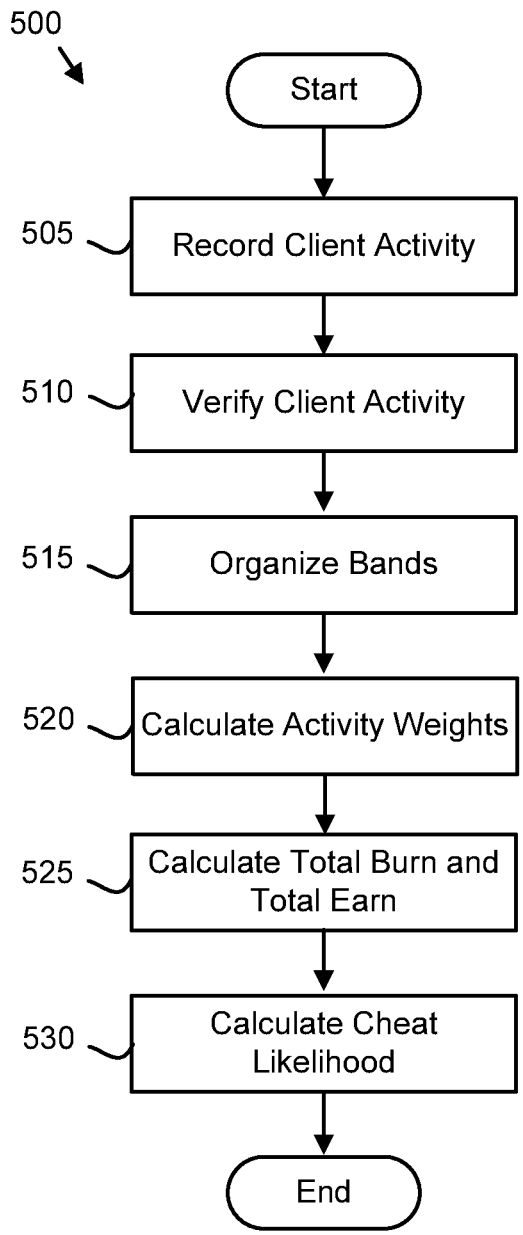
FIG. 4 is a schematic flow chart diagram illustrating one embodiment of a cheat likelihood calculation method.

FIG. 3 is a schematic block diagram illustrating one embodiment of a computer 295. The server cluster 103 may include one or more computers 295. In the depicted embodiment, the computer includes a processor 296, a memory 297, and communication hardware 298. The memory 297 may be a semiconductor storage device, a hard disk drive, a micromechanical storage device, an optical storage device, or combinations thereof. The memory 297 may store code. The processor 296 may execute the code. The communication hardware 298 may communicate with other devices such as the communication network 102.

Process Overview

Figure 5A:
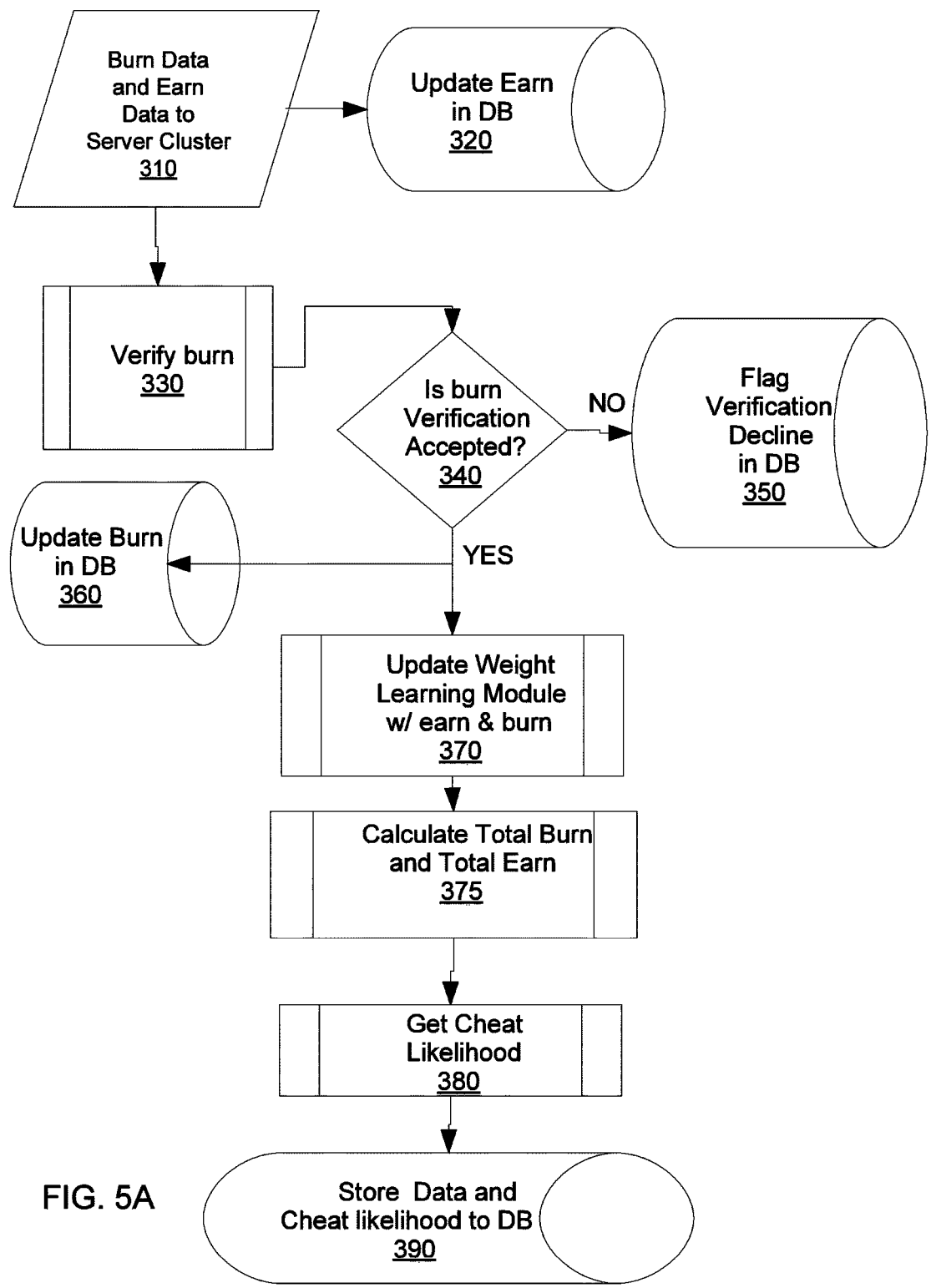
FIG. 5A is a schematic block diagram illustrating one embodiment of a cheat likelihood calculation data flow.

FIG. 5A is a schematic block diagram illustrating one embodiment of a cheat likelihood calculation data flow 500. The method 500 may calculate a cheat likelihood from a probability of client activity being anomalous. The method 500 may be performed by the processor 296. Alternatively, the method 500 may be performed by computer readable storage medium such as the memory 297. The computer readable storage medium may store code that is executed by the processor 296 to perform the functions of the method 500.

The method 500 starts and in one embodiment, the code records 505 client activity for a client 101. The client activity may be recorded in the log 270 and communicated to the server cluster 103. The client activity includes components of the game economy such as burns and earns. For example, the code may record 505 all earns to the earn data 250 and all burns to the burn data 200. The burns may be calculated as a function of measurable client sacrifices to the game. The earns may be calculated as a function of measurable game rewards from the game.

In one embodiment, the code verifies 510 the earn data 250 and the burn data 200 from the client activity. The verification of the earn data 250 and the burn data 200 is described in more detail for FIG. 5A.

The code may organize 515 the burns of the burn data 200 into bands of band data 220 with corresponding earns of earn data 250. In one embodiment, the code may organize 515 the bands by dividing a band in response to the band not satisfying the band policy. In one embodiment, the band policy is not satisfied by exceeding a maximum variance for a statistical model for the band.

The code may calculate 520 activity weights from the client activity recorded for the client 101. In one embodiment, the activity weights are calculated from the burn data 200 and the earn data 250. The activity weights may comprise burn weights and earn weights. Equation 1 shows one embodiment of the total earn calculation TOTAL EARN VALUE, where $\theta_i$ is an ith activity weight and $w_i$ is a watched scalar for the activity weight.

$$\text{TOTAL EARN}=\Sigma_{i=1}^{m}\theta_i w_i \qquad \text{Equation 1}$$

The activity weight may be calculated using Equation 2, where x is the set of every earn of the earn data 250 and the additive inverse of every burn of the burn data 200 and h is a hypothesis for calculating the activity weight given the earn and the predecessor activity weights. The hypothesis h may be calculated using Equation 3.

$$\theta_i=\theta_i-(\lambda * h * x_i) \qquad \text{Equation 2}$$

$$h=\Sigma_{i=1}^{m}\theta_i x_i \qquad \text{Equation 3}$$

In one embodiment, the activity function COST is calculated using Equation 4, where m is a number of a plurality of client activities, a is a given client activity of the plurality of client activities, $\text{burn}_a$ is a burn value for the given client activity of B activities with burn values calculated as $\text{burn}_a = \Sigma_{i=0}^{B} \theta_{bai} * \text{burn}_{ia}$ where $\theta_{bai}$ is a burn weight for an ith activity a of E activities with earn values, $\text{earn}_a$ is an earn value for the given client activity calculated as $\text{earn}_a = \Sigma_{i=0}^{E} \theta_{eai} * \text{earn}_{ia}$ where $\theta_{eai}$ is an weight for an ith client activity a.

$$\text{COST}=\Sigma_{a=0}^{m}(\text{burn}_a - \text{earn}_a)^2 \qquad \text{Equation 4}$$

Alternatively, the activity function COST may be calculated using Equation 5, where $\Theta_i$ is a last learned activity weight, n is a number of the activity weights, S is a number of cumulative samples, and C is an economy change value. The economy change value C may be a value between 0 and 1, with 0 represented maximum change and 1 representing no change.

$$\text{COST}=\Sigma_{a=0}^{m}((\text{burn}_a - \text{earn}_a)^2 SC\Sigma_{i=0}^{n}(\theta_i - \Theta_i)^2) \qquad \text{Equation 5}$$

In one embodiment, the learning rate is initially calculated as a specified value yielding a minimum activity COST function. Alternatively, the learning rate may be selected by calculating the minimum activity COST function for at least three learning rates, each learning rate with at least an order of magnitude separation from each other learning rate, and selecting the learning rate that yields the lowest activity COST function. In addition, the learning rate may be selected by selecting at least three next learning rates based on a selected learning rate and selecting the activity weights and the learning rate that yields the lowest activity COST function for all learning rates.

The code may calculate 525 a total burn and a total earn from the activity weights for the client activity. The total burn and the total earn may be calculated using the total earn calculation of Equation 1. The calculation 525 of the total burn and the total earn are described in more detail in FIG. 5D.

The code may calculate 530 a cheat likelihood from a probability of the client activity being anomalous and the method 500 ends. The calculation 530 of the cheat likelihood is described in more detail in FIG. 5D.

FIG. 5A gives a process overview from the point an incoming log of activity being received, to the point a cheat-likelihood for that activity and stored in the database. Block 310 shows the client 101 interacting with the server cluster 103 by periodically sending a log containing new information for the server cluster 103 to associate with the user's play. The log may include the burn data 200 and the earn data 250. The log 270 is received by the server cluster 103. Through the mechanism of the log 270, the scalar values 285 will be transmitted to the server cluster 103 to be saved to the database cluster 100 for.

In block 320 "unverified earn" components (e.g. scalars) will be parsed from the log file and updated in the burn data 200 and earn data 250. Verified burn components are indications of user sacrifice that are verifiable. Because the burn components are verifiable, the embodiments don't rely on the client's declarations. In described rules-based system, the consumer will make certain sacrifices that can be measured—for example, the total money spent recorded in the spend data 205 and total play time recorded in the playtime data 210. Thus the earns and burns are verifiable.

Block 330 is the process to check with external systems (e.g. payment gateways) in order to verify each burn value. In the case "playtime" is used as a verifiable burn value, instead of verifying this value externally we would calculate this value internally. The following steps can be performed to calculate this value. First, the burn data 200 is updated with the last update time whenever an activity comes in. Next, the playtime data 210 is updated by adding the difference between that and the current time to the users total play time if that difference is within a configurable "session demarcation threshold" time value (which is set to 5 minutes by default).

In block 340, burn values other then playtime, external systems will either accept or decline the verification attempt. Burn values are declared in the log file by the client, but must be verified or derived outside of the client declaration. For example, spend data 205 can be used as a verifiable burn value. In this case, the log file will indicate claims about purchases which in turn the server will verify with an external service (e.g. payment service in the case of total money spent). If we suspect latency issues with the external system, we can add logic to verify activities at a later time (when we are sure they could be verified). Viral Installs from the viral installation data 215 is another common behavior that could be used as a burn component and there could be other burn components. Block 350 occurs if a verifiable burn value gets declined by the verification system. In block 350 the activity is flagged as "verification declined" in the Activity table of the data base, along with details about the false claim. In block 360 the database is updated for burn values that are being tabulated with the user after the verification is accepted.

Figure 5B:
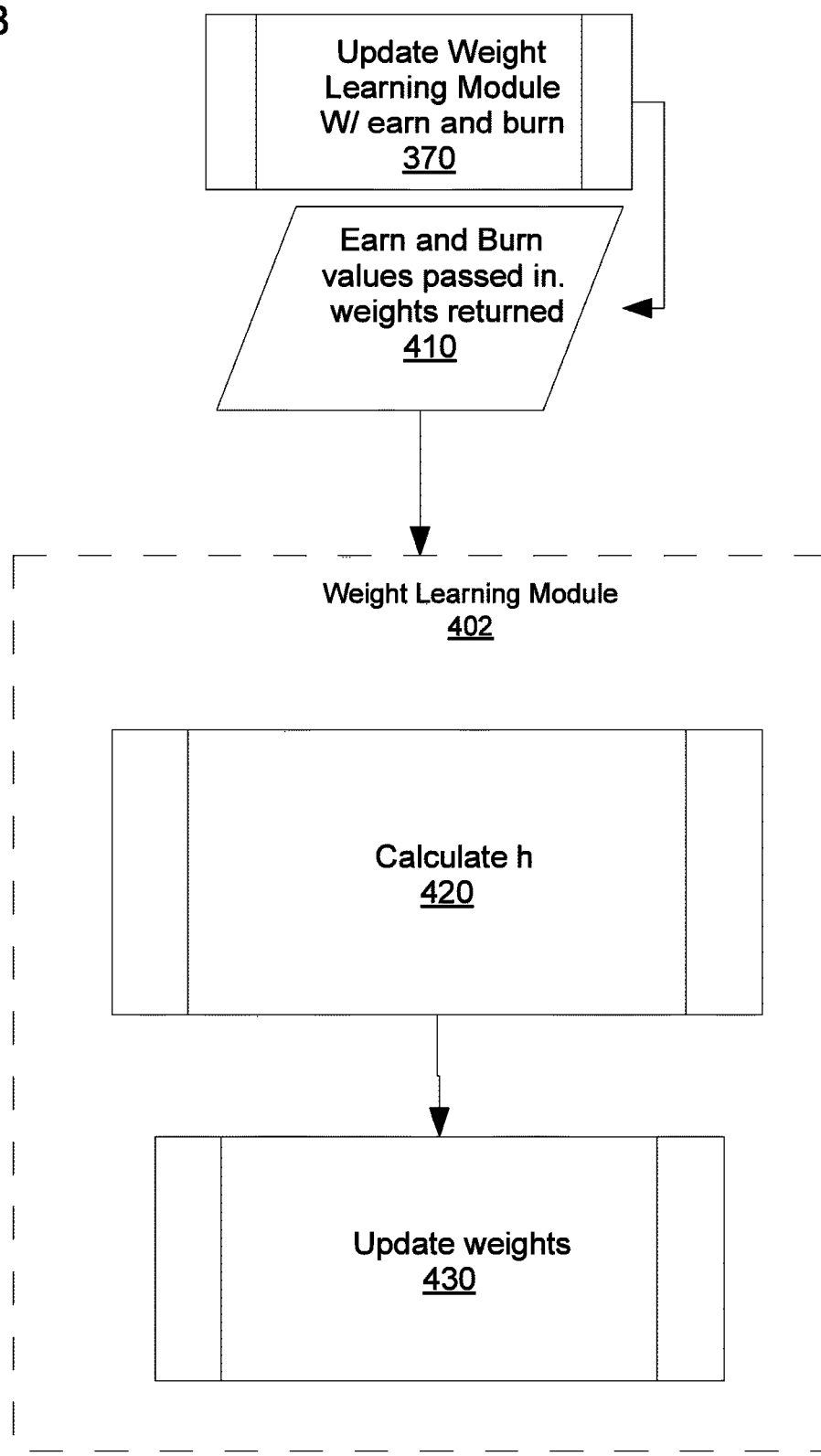
FIG. 5B is a schematic block diagram illustrating one embodiment of a weight learning calculation data flow.
Figure 5C:
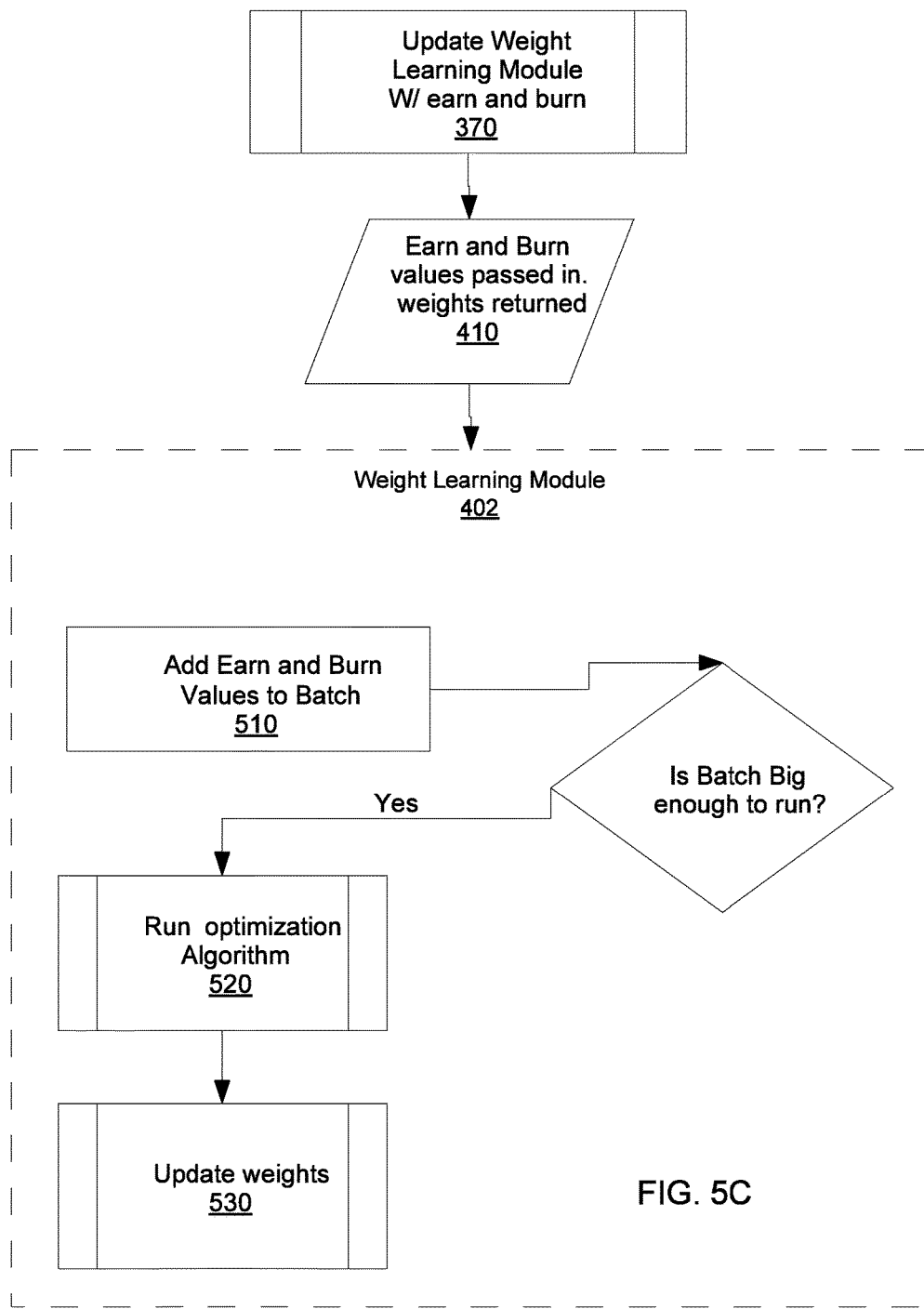
FIG. 5C is a schematic block diagram illustrating one alternate embodiment of a weight learning calculation data flow.
Figure 5D:
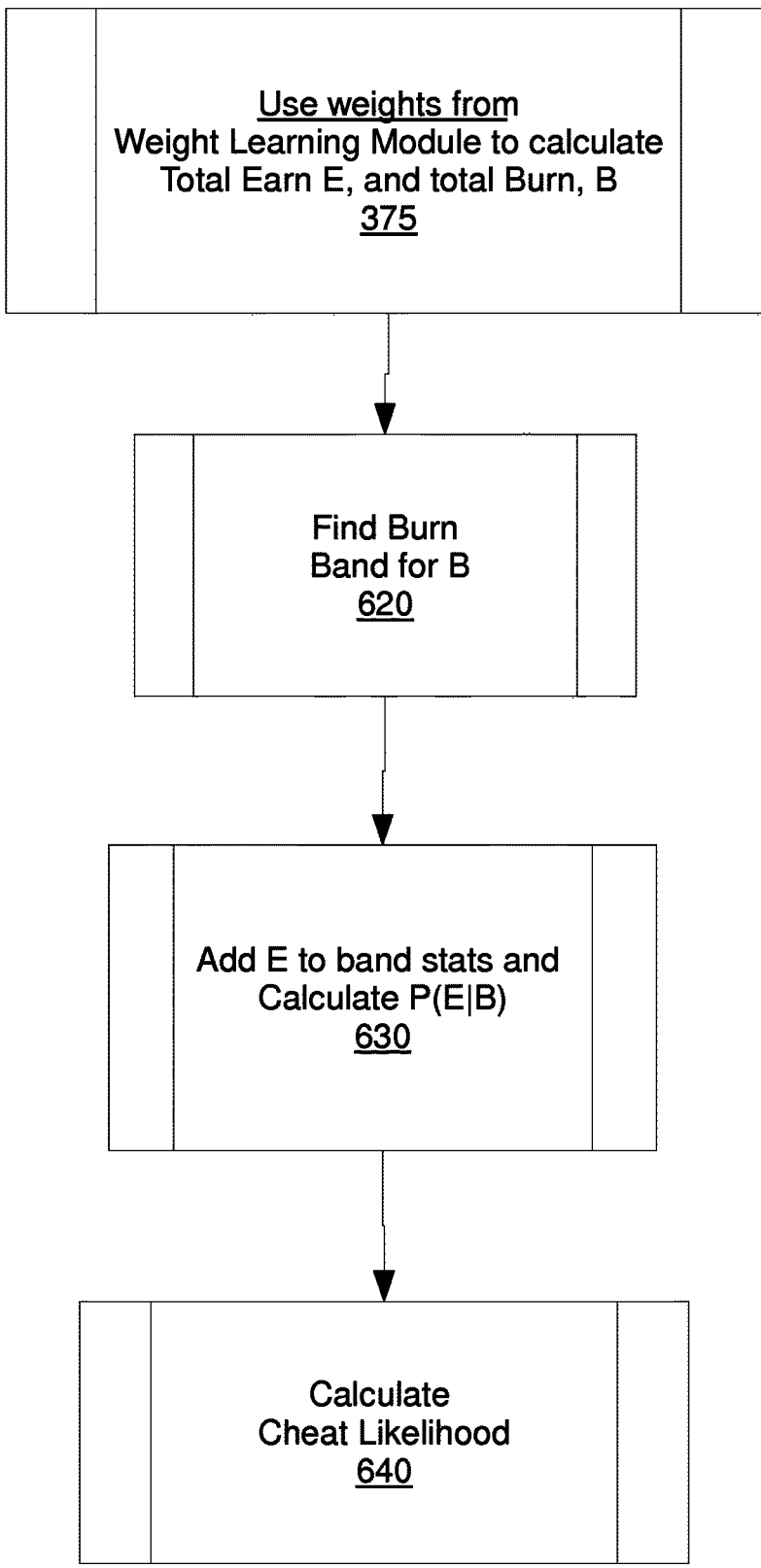
FIG. 5D is a schematic block diagram illustrating one embodiment of cheat likelihood calculation data flow.

FIG. 5B is a schematic block diagram illustrating one embodiment of a weight learning calculation data flow. In block 370 the Earn and Burn values from the earn data 250 and the burn data 200 are provided to the Weight Learning Module 402 to learn the appropriate activity weight for the Earn and Burn component in the Total Earn and Total Burn equations (below). The Weight Learning Module 402 may need a minimal amount of data in band data 220 before it can provide valid weights. Until then the code may throw a "weights not ready" exception. FIGS. 5C-D describe two alternative linear regression algorithms for learning weights. Block 375 uses the learned weight of each earn and burn component to reduce a user's model to two dimensions, Total Earn and Total Burn.

Total Earn represents how much the user has gotten out of the game activity, calculated as the cross product of all of the Earn values and their learned weights. In our example we use "watched scalars," scalar values 285 with a set watched flag 283, as the earn values. Thus a total earn is calculated using Equation 6, where "i" iterates through all earn components (e.g. watched scalars), and the theta values, and $\theta$ are the corresponding activity weights for those scalars as generated by a Weight Learning Module.

$$\text{totalearn} = \Sigma \theta_i * \text{watchedscalar}_i \qquad \text{Equation 6}$$

Total Burn represents how much the user has expended or sacrificed in the game activity, and is measured as the sum of all weighted Burn Components, as shown in Equation 7.

$$\text{totalburn} = \Sigma \theta_i * \text{burncomponent}_i \qquad \text{Equation 7}$$

Given the above, for our two most common burn components we would simplify to Equation 8, where "Played" is the amount of time the user has spent interacting with the application as recorded by the playtime data 210, and "Paid" is the amount of money the user has spent on the application as recorded by the spend data 205, and $\theta_O$ and $\theta_1$ are learned activity weights.

$$\text{totalburn} = \theta_O * \text{Played} + \theta_1 * \text{Paid} \qquad \text{Equation 8}$$

In block 380 the Cheat Likelihood Module returns a cheat-likelihood. This is accomplished by supplying the module with Total Earn and Total Burn. The Cheat Likelihood Module will apply statistical methods to produce a cheat-likelihood. If activity A has a higher cheat-likelihood than activity B, it means activity A was more likely to be the result of cheating. Finally in block 390 represents the complete data set including the log 270, the burn data 200, and the earn data 250 is stored in database cluster 100 for and tied to the user ID and time stamp, cheat likelihood, and the earn and burn values.

Finding Cheat Likelihood

FIG. 5B gives a process overview for the "online" method to learn the appropriate weights for the Earn and Burn components as activity data streams in. In block 410 the Weight Learning Module is called with all earn and burn values for the activity. It immediately returns the latest weights for the Total Earn and Total Burn equations. In block 420 we multiply the value of the burn components by −1 to find the corresponding inputs for burn values, and we will take the earn values directly as their inputs. Thus for exemplary burn components PAID and PLAYED recorded in the burn data 200, and earn components from the watched scalars and recorded in the earn data 250: $x_O$ is the total paid times −1, $x_1$ is the time played time −1, and $x_2$ through $x_n$ are the value of all of the watched scalars. We calculate h for a given x with the previous weights $\theta_i$ with Equation 3.

The code may learn better activity weights by adjusting the activity weights based on the new earn and burn data by using Equation 2. Block 430 updates the internal state variables for the activity weights held inside the Weight Learning Module. The update results in having better activity weights to calculate total Earn and total Burn by using the Total Earn and Total Burn equation described above in Equation 6-8.

Weight Learning Module: Batch Linear Regression

FIG. 5C is a schematic block diagram illustrating one alternate embodiment of a weight learning calculation data flow, and gives a process overview for the "batch" method to learn the appropriate activity weights for the Earn and Burn components as client activity data is received. The Batch Linear Regression method of learning weights is an alternative to the online method described above, where information is processed in batches. This method requires more server resources and doesn't update weights nearly as quickly, but should find more accurate weights after processing. In block 510 the incoming earn and burn values being added as a row to the "batch", a matrix of earn and burn values for numerous activities. Then in block 520 the batch has enough rows to be run (a configurable amount of rows of data, set to 50,000 rows by default), the code may pass the data over and use an optimization algorithm to find the best weights to minimize the cost function described below. The code may also empty the batch matrix which will continue to accept data for the next batch as the moved over batch is processed.

With the insight that Total Burn=Total Earn, we aim to learn activity weights that will minimize Equation 4. The code may separate out activity weights as earn activity weights and burn activity weights $\theta_b$ and $\theta_e$ respectively.

Unless it is the first time calculating a cheat score, the code has already learned activity weights with previous processing. The code may incorporate previous activity weights using Equation 5. Initially cumulative samples S=0. After each batch is run, S=S+n. The economy change value C is a value between 0 and 1 meant to penalize samples that have become less relevant. The economy change value C should be derived based on how much the economy has changed since the last weights where learned. If the economy is completely new relative to when the last batch was run, C should be 0. If it hasn't changed at all, C should be 1. The administrator should have a way of indicating how much the economy has changed whenever it changes, and the code will derive C from that indication.

In one embodiment, the activity function COST is optimized. The activity function cost may be optimized using an algorithm such as gradient descent that finds the weights θ that minimize the activity function. If gradient descent is used as the optimization algorithm, the code may choose a learning rate λ, as will be described hereafter.

Weight Learning Module: Hybrid Approach

A third alternative for the Weight Learning Module is to improve the Batch Algorithm by using the online algorithm to update learned weights in real time while the batch is collected. The system 100 would start with values for the weights that resulted from the last run of the batch algorithm and would continue to update weights with the online algorithm while the next batch was collected. When the batch algorithm processes again, the cost function would use previous activity weight values (which represents previously learned activity weights), based on the previously learned Batch Algorithm and not the ones learned by the online learning system. When processing is complete, the activity weights used by the online algorithm would again be replaced with the activity weights learned by the batch learning algorithm.

Finding the Learning Rate:

Before deploying the software, the code may find the optimal learning rate λ for the algorithm and data. The code may find the optimal value for λ from a small group of options by using each possible value in the algorithm against a test set of data, and choosing the one that results in weights that give the lowest cost for the activity function COST.

First the code may find the optimal from the following options: 1, 0.1, 0.01, 0.001, and 0.0001. Then the code may try the optimal value against ⅓ its value and 3 times its value to find a new optimal value. Finally the code may try the new optimal value against ½ its value and 2 times its value to find our final optimal value.

Statistical Model

To build a statistical model, the code may organize the discrete "bands" of band data 220, or ranges of burn data 200 and corresponding earn data 250. Each band can calculate probability of a particular E (total earn value) for that band by storing statistical data about other E values. For example, the code may have one band of burn data 200 between 10 and 20 or even one between 25.467 and 25.468. Each band will contain the necessary statistical information to answer the "what is the probability of E for this band".

FIG. 5D is a schematic block diagram illustrating one embodiment of cheat likelihood calculation data flow, showing a process that uses total earn and total burn values to create a statistical model that determines the probability of a total earn value given the total burn value. This statistical model aggregates an amount of values (n), the sum of values (sum), and the sum of the values squared (ssq) to be able to quickly calculate the mean and a standard deviation of earn values for every burn band. Two alternatives include structuring the bands as an array, where band ranges are fixed, or structuring the bands as a tree, which allows the bands to adapt their ranges and the statistical model they keep, as demonstrated in FIG. 7.

Block 620 finds the burn band. For an array of burn bands the code may find the index of the band directly, and reference it within the array to get the actual band. Given a particular burn value B, the code may find the burn band index I by diving B by the amount of bands and rounding up. We can find the appropriate band directly by accessing the array of bands at index I.

Figure 5E:
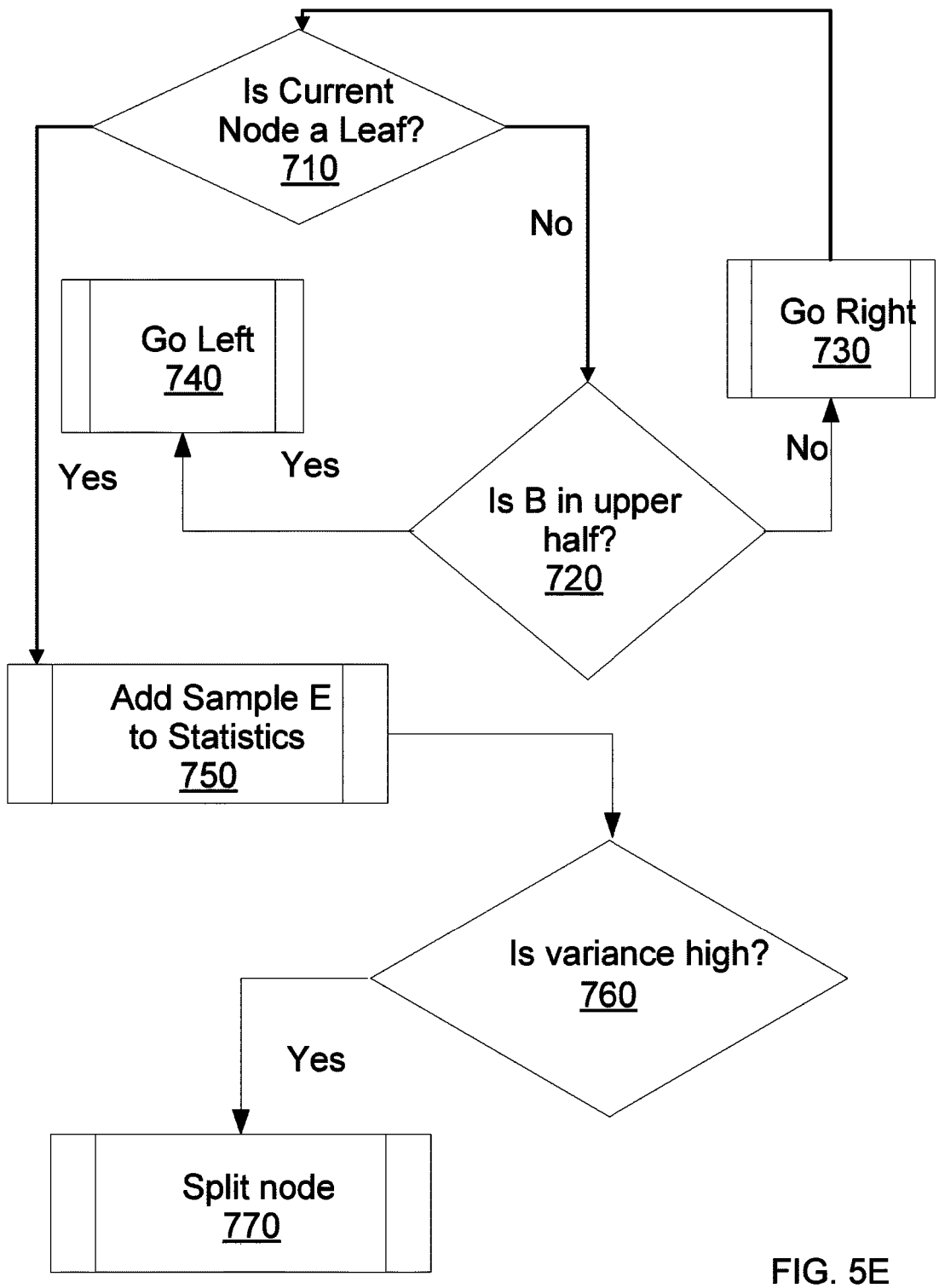
FIG. 5E is a schematic flow chart diagram illustrating one embodiment of organizing bands.

FIG. 5E is a schematic flow chart diagram illustrating one embodiment of organizing bands. For a burn band tree, the code may traverse the tree, as is illustrated in block 710, 720, 730 and 740, going to the right child when the burn value is in the upper half of the range of the node, or the left child when it's in the lower half.

Band data organization 235 may form trees of band data 220 that are adaptive, because of the "splitting" mechanism. This mechanism ensures statistical models within each band are over small enough ranges to be precise, but also have enough data to be statistically significant. It does this by splitting the band into halves as needed.

In Block 760, once the variance in the statistical model exceeds the "maximum variance" (which is configurable by administrator in the banding policy, but is 0.1 by default) and has at least the minimal amount of samples and that the amount of samples (N) is an even number, then the node is split into 2 children. The right child will handle the upper half of the parent's burn data 200, and the left child will handle the lower half of the parent's burn data 200. The node that was split no longer holds statistical state variables, but instead has a right and left pointer that respectively point to the nodes that hold statistical models for the lower and upper half of the range of values which hold the following statistical state variables:

For calculating the number of nodes n of burn data 200 for the lower node, as well as the min and max for its range, the following Equations are used $$\text{lower\_}n = \text{parent\_}n/2 \qquad \text{Equation 9}$$

$$\text{lower\_min} = \text{parent\_min} \qquad \text{Equation 10}$$

$$\text{lower\_max} = (\text{parent\_max} - \text{parent\_min})/2 \qquad \text{Equation 11}$$

$$\text{upper\_max} = (\text{parent\_max} - \text{parent\_min})/2 \qquad \text{Equation 12}$$

$$\text{upper\_}n = \text{parent\_}n - \text{lower\_}n \qquad \text{Equation 13}$$

$$\text{upper\_max} = \text{parent\_max} \qquad \text{Equation 14}$$

$$\text{upper\_min} = \text{lower\_max} \qquad \text{Equation 15}$$

The code may create a temporary variable r which is the ratio between the sum of values for the lower and upper nodes, as shown in Equation 16.

$$r = (\text{upper\_max} - \text{upper\_min})/(\text{lower\_max} - \text{lower\_min}) \qquad \text{Equation 16}$$

The sum and sum squared (sSq) values for the lower and upper node may be calculated using Equations 17-20.

$$\text{Lower\_sum} = \text{parent\_sum}/(r+1) \qquad \text{Equation 17}$$

$$\text{lower\_sSq} = \text{parent\_sSq}/(r+1)^2 \qquad \text{Equation 18}$$

$$\text{upper\_sum} = \text{parent\_sum} - \text{lower\_sum} \qquad \text{Equation 19}$$

$$\text{upper\_sSq} = \text{parent\_sSq} - \text{lower\_sSq} \qquad \text{Equation 20}$$

The code may also choose to reduce the weight of statistics that were estimated from the split to penalize the loss of precision relative to the values that come in after the split. This penalty would be a value configurable by the administrator but 0.8 by default. The code may apply this penalty as shown in Equation 21.

$$n = n*\text{penalty sum} = \text{sum}*\text{penalty sSq} = \text{sSq}*\text{penalty}^2 \qquad \text{Equation 21}$$

Block 630 of FIG. 5D incorporates the sample E to its statistical model, and after that the code may retrieve the probability of total earn (E), given total burn (B). One method of achieving this is to map the inputs to a Gaussian normal model. To do that the code may tabulate variables inside the band as shown in Equations 22-24.

$$n = n+1 \text{ (}n\text{ is the amount of samples)} \quad \text{Equation 22}$$

$$s = s+E \text{ (}s\text{ is the aggregate sum of }E\text{)} \quad \text{Equation 23}$$

$$sSq = sSq + E\char`\^2 \text{ (}sSq\text{ is the aggregate sum of }E\char`\^2\text{)} \quad \text{Equation 24}$$

Those aggregated values allow the code to quickly calculate the mean, μ and standard deviation $\sigma^2$ for the earn values within each burn band using Equations 25-26.

$$\mu = \frac{s}{n} \quad \text{Equation 25}$$

$$\sigma^2 = (sS\bar{q} - (s^2)/n)(n - 1) \quad \text{Equation 26}$$

With the mean and standard deviation, the code may estimate the probability for a particular earn value given a burn, x value using Equation 27.

$$p(x; \mu, \sigma^2) = \frac{1}{\sqrt{(2\pi\sigma^2)}} e^{-(x-\mu^2)/2\sigma^2} \quad \text{Equation 27}$$

If n is below the minimum for significance (which is configurable by the administrator but 200 by default), then the probability does not yet contain enough samples to return a reliable probability. One way the code may handle this is to throw a "band not ready" exception instead of returning a number. It's also possible that the weights used were not ready (due to lack of having enough samples), in which case the code propagate that exception. One way of handling the exception would be to put the activity on a queue so it will be re-evaluated once there is enough data.

Finally, in block 640, having calculated P(E|B) allows the calculation of the Cheat Likelihood. First, the code propagates any exceptions for not having enough data. Next, if earns exceed earns, the cheat likelihood CL is calculated using Equation 28, where P(E) is the probability of the earns given the burns.

$$CL = 1 - P(E) \quad \text{Equation 28}$$

Separating Statistics by User Groups

Because particular user groups may have less or more cheating activity, the embodiments support the ability to keep different buckets of statistics. The code may have a burn band organization 235 or tree for every user group (i.e. bucket of statistics). The code may add data to a particular user group, if that data is for a user that is in line with the criteria or characteristics that define that user group. Given this approach, the code may get a probability for that data from each group. In one embodiment, the code takes the lowest valid probability returned from all of the groups, since the group that returns the lowest probability is likely to have been least skewed by cheating.

AB Testing

Sometimes administrators of the system 100 might want to A-B test different economies. The code may support A-B testing it in one of 3 ways. The first way would be to ignore the test entirely since the economies are not extremely different. If the economies are extremely different, the code may have buckets for each economy variation just like for the different user groups. If the economies being tested are completely different the code may have different instances of the Weight Learning Module 402 for each variation as well as the separate statistical buckets. This way each variation would have its own weights as well as its own statistical buckets.

Learning Thresholds for Classification

Whenever the administrator designates an activity as "anomalous" or "normal" we have an opportunity to improve the way we classify. Classification is the automated way of marking an activity as "anomalous", "normal" or "needs review". This is done based on learned threshold values for the cheat index. If the cheat index is below the minimum threshold the activity will be classified as "normal". Conversely if the cheat index is above the high threshold, the activity will be classified as "anomalous". Initially we want to review as much as possible, so any cheat index above 0 is marked review (the rest are normal), but as the administrator designates activities, we can learn better thresholds.

Figure 5F:
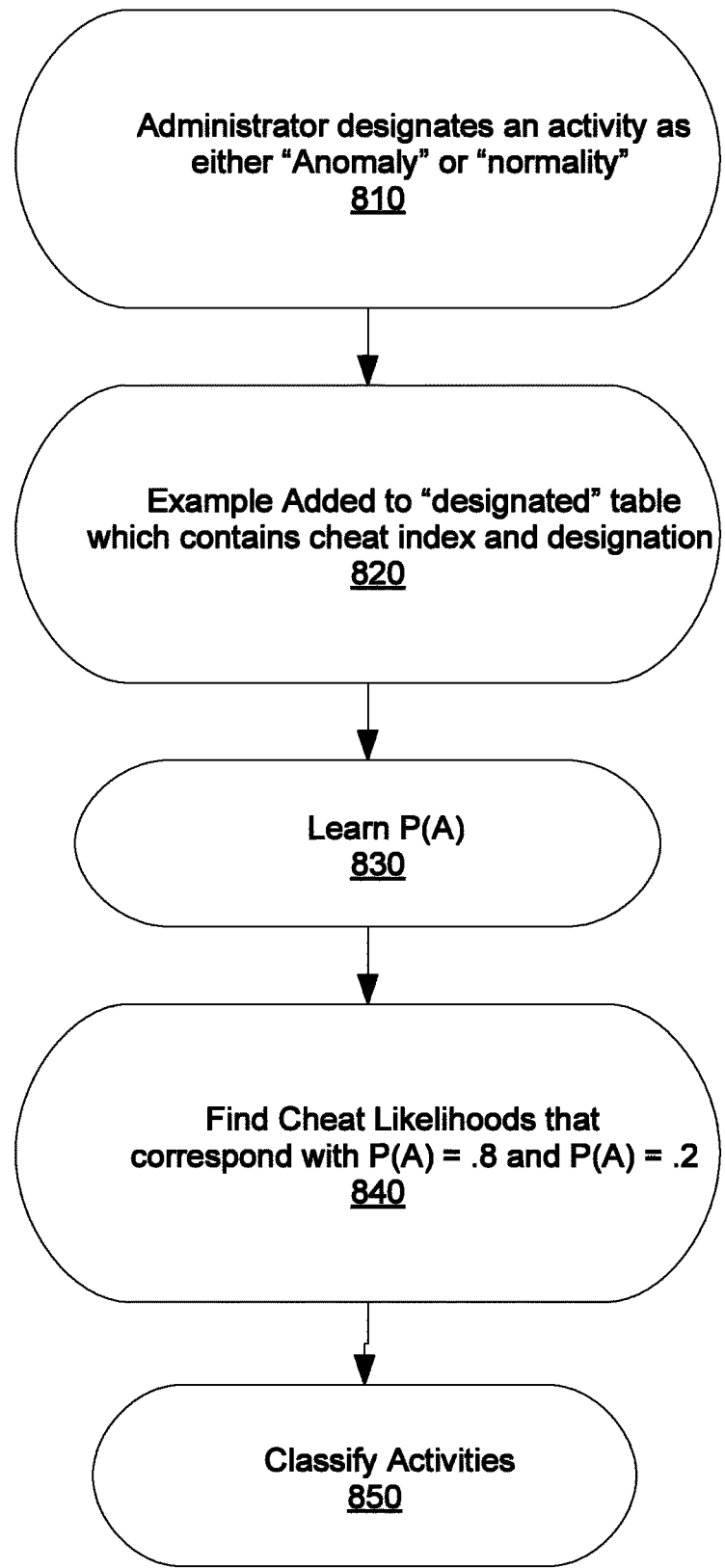
FIG. 5F is a schematic block diagram illustrating one embodiment of an activity classification method.

FIG. 5F is a schematic block diagram illustrating one embodiment of an activity classification method. FIG. 5F illustrates a process by which the system 100 learns the cheat index thresholds to use in order to classify activities as anomalous or normal, based on manual designations made by the administrator. In Block 810 the Administrator reviews the log file for an activity and decides to designate it as either "anomalous" or "normal" using the administration client. In block 820 the designation example and its corresponding cheat index are added to a designation table in the data base. In block 830, if there is at least enough data (e.g. 100 designations), a classification algorithm (e. g. logistic regression) is run with the cheat index as the input x and the designation as the output y. With logistic regression, the algorithm will return parameters θ such that we can get the probability that a particular cheat likelihood is anomalous as shown in Equations 29 and 30, where X is achieved likelihood.

$$h_\theta(x) = g(\theta^T x) = P(y = 1; x; \theta) \quad \text{Equation 29}$$

$$g(z) = \frac{1}{(1 + e^{-z})} \quad \text{Equation 30}$$

Classification can also be done using support vector machine algorithm or a number of other classification algorithms.

Block 840 finds Cheat likelihood threshold values such that "anomalous" corresponds with at least an 80% probability of being anomalous, and normal corresponds with at most a 20% probability of being anomalous and the rest are classified "review". We can use the parameter to solve for the cheat likelihood's associated with these probabilities as shown in Equation 31.

$$x = \ln\left(\frac{1}{p} - 1\right)/\theta^T \quad \text{Equation 31}$$

In one embodiment, the code uses p=0.8 to calculate an upper threshold and p=0.2 to calculate a lower threshold. The values for the probabilities required for classification will be set to 80% and 20% by defaults, but these values are configurable by the administrator. Block 850 classifies of activities based on the learned thresholds and initiates automated actions. Specifically if there are learned thresholds of 0.8 and 0.7, all activities with a cheat-likelihood score of 0.8 and above will be classified as "anomalous", activities with a cheat-likelihood below 0.7 will be classified as normal, and the rest will be classified as "review." If client activities enter the anomalous group by scoring a cheat index that is above the threshold, the client activities will be subject to an automatic response as specified by the administrator such as banning, warning, email, a state reset, and the like.

The embodiments calculated cheat likelihood for client activity, allowing administrators of an online game or gamified application to identify and mitigate cheating. The cheat likelihood is calculated based on the probability of the client activity being anomalous. Activity weights from the client activity may be calculated by minimizing an activity function. Using the activity weights, a total burn and a total earned may be calculated and used to calculate the cheat likelihood.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
 recording, by use of a processor, client activity for a client, wherein the client activity comprises burn data calculated as a function of measurable client sacrifices to a game and earn data calculated as a function of measurable game rewards from the game, wherein the burn data is organized into at least one band with corresponding earn data and the burn data and the earn data in the band do not exceed a maximum allowable variance;
 calculating activity weights from the at least one band, wherein the activity weights are calculated by minimizing an activity function COST that is based on the client activity, the activity weights comprising burn weights and earn weights;
 calculating a total burn and a total earn from the activity weights for the client activity;
 calculating a probability of the client activity from the total burn and the total earn; and
 calculating a cheat likelihood from a probability of the client activity being anomalous.

2. The method of claim 1, wherein the activity weights are calculated by minimizing an activity function COST, COST is calculated as $COST = \Sigma_{i=1}^{m} \theta_i w_i$, and wherein m is a number of a plurality of client activities, each ith activity weight $\theta_i$ is calculated as $\theta_i = \theta_i - (\lambda * h * x_i)$ for a given ith client activity i, $\lambda$ is a learning rate, $x_i$ is an earn and a burn additive inverse, h is a hypothesis for calculating the activity weight $\theta_i$ given the earned and the predecessor activity weights, and $w_i$ is a watched scalar for the activity weight.

3. The method of claim 2, wherein the learning rate is initially calculated as a specified value yielding a minimum activity COST function.

4. The method of claim 2, wherein the learning rate is selected by calculating the minimum activity COST function for at least three learning rates, each learning rate with at least an order of magnitude separation from each other learning rate, and selecting the learning rate that yields the lowest activity COST function.

5. The method of claim 4, the method further comprising iteratively selecting at least three next learning rates based on a selected learning rate and selecting the activity weights and the learning rate that yields the lowest activity COST function for all learning rates.

6. The method of claim 1, wherein the activity function COST is calculated as $COST = \Sigma_{a=0}^{m}(burn_a - earn_a)^2$ where m is a number of a plurality of client activities, a is a given client activity of the plurality of client activities, $burn_a$ is a burn value for the given client activity calculated as $burn_a = \Sigma_{i=0}^{B} \theta_{bai} * burn_{ia}$ where $\theta_{bai}$ is a burn weight for an ith activity a of B burn component with burn values, $earn_a$ is an earn value for the given client activity calculated as $earn_a = \Sigma_{i=0}^{E} \theta_{eai} * earn_{ia}$ where $\theta_{eai}$ is an earn weight for an ith client activity a of E earn components with earn values.

7. The method of claim 1, wherein the activity function COST is calculated as $COST = \Sigma_{a=0}^{m}((burn_a - earn_a)^2 + SC \Sigma_{i=0}^{n}(\theta_i - \Theta_i)^2)$ where m is a number of a plurality of activities, $\theta_i$ is an activity weight, $\Theta_i$ is a last learned activity weight, a is a given activity of the plurality of activities, n is a number of the activity weights along a learning procedure for the given activity a, $burn_a$ is a burn value for the given activity a of B burn components with burn values calculated as $burn_a = \Sigma_{i=0}^{B} \theta_{bai} * burn_{ia}$ where $\theta_{bai}$ is a burn weight for an ith activity a, $earn_a$ is an earn value for the given activity a of E earn components with earn values calculated as $earn_a = \Sigma_{i=0}^{E} \theta_{eai} * earn_{ia}$ where $\theta_{eai}$ is an earn weight for an ith activity a, S is a number of cumulative samples, and C is an economy change value.

8. The method of claim 7, wherein the economy change value is a value between 0 and 1, with 0 represented maximum change and 1 representing no change.

9. The method of claim 1, wherein the at least one band is divided in response to the burn data and the earn data for the at least one band exceeding a maximum allowable variance.

10. An apparatus comprising:
 a server comprising:
 a processor;
 a memory that stores code executable by the processor to perform:
 recording client activity for a client, wherein the client activity comprises burn data calculated as a function of measurable client sacrifices to a game and earn data calculated as a function of measurable game rewards from the game, wherein the burn data is organized into at least one band with corresponding earn data and the burn data and the earn data in the band do not exceed a maximum allowable variance;
 calculating activity weights from the at least one band, wherein the activity weights are calculated by minimizing an activity function COST that is based on the client activity, the activity weights comprising burn weights and earn weights;
 calculating a total burn and a total earn from the activity weights for the client activity;
 calculating a probability of the client activity from the total burn and the total earn; and
 calculating a cheat likelihood from a probability of the client activity being anomalous.

11. The apparatus of claim 10, wherein the at least one band is divided in response to the burn data and the earn data for the at least one band exceeding a maximum allowable variance.

12. A program product comprising a non-transitory computer readable storage medium that stores code executable by a processor, the executable code comprising code to perform:
 recording client activity for a client, wherein the client activity comprises burn data calculated as a function of measurable client sacrifices to a game and earn data calculated as a function of measurable game rewards from the game, wherein the burn data is organized into at least one band with corresponding earn data and the burn data and the earn data in the band do not exceed a maximum allowable variance;

calculating activity weights from the at least one band, wherein the activity weights are calculated by minimizing an activity function COST that is based on the client activity, the activity weights comprising burn weights and earn weights;

calculating a total burn and a total earn from the activity weights for the client activity;

calculating a probability of the client activity from the total burn and the total earn; and calculating a cheat likelihood from a probability of the client activity being anomalous.

13. The program product of claim 12, wherein the activity weights are calculated by minimizing an activity function COST, COST is calculated as $COST = \Sigma_{i=1}^{m} \theta_i w_i$, and wherein m is a number of a plurality of client activities, each ith activity weight $\theta_i$ is calculated as $\theta_i = \theta_i - (\lambda * h * x_i)$ for a given ith client activity i, $\lambda$ is a learning rate, $x_i$ is an earn and a burn additive inverse, h is a hypothesis for calculating the activity weight $\theta_i$ given the earned and the predecessor activity weights, and $w_i$ is a watched scalar for the activity weight.

14. The program product of claim 12, wherein the at least one band is divided in response to the burn data and the earn data for the at least one band exceeding a maximum allowable variance.

* * * * *